United States Patent [19]

Moreau et al.

[11] 4,230,459
[45] Oct. 28, 1980

[54] PROCESS FOR AGGLOMERATING PARTICULATE WOOD MATERIAL AND PRODUCTS OBTAINED THEREBY

[76] Inventors: Jean R. Moreau, 2988, La Promenade, Ste-Foy, Québec, Canada, G1W 2J7; Martin P. Pelletier, 16, rue Pelletier, Cabano, Quebéc; Gérard B. Tremblay, 271, rue Cormier, Arvida, Quebéc, both of Canada

[21] Appl. No.: 10,324

[22] Filed: Feb. 7, 1979

[30] Foreign Application Priority Data

Sep. 20, 1978 [CA] Canada .................................. 311711

[51] Int. Cl.³ ............................ C10L 5/40; C10L 5/20
[52] U.S. Cl. ..................................... 44/10 B; 44/16 F
[58] Field of Search ................... 44/10 B, 15 D, 16 F, 44/10 G

[56] References Cited

U.S. PATENT DOCUMENTS

| | | | |
|---|---|---|---|
| 1,743,985 | 1/1930 | Strehlenert | 44/16 F |
| 2,567,136 | 9/1951 | Vloeberghs | 44/15 E |
| 2,789,890 | 4/1957 | Stevens | 44/41 |
| 3,227,530 | 1/1966 | Levelton | 44/1 R |
| 3,297,419 | 1/1967 | Eyre, Jr. | 44/6 |
| 3,635,684 | 1/1972 | Seymour | 44/10 R |

FOREIGN PATENT DOCUMENTS

12516 of 1906 United Kingdom ................... 44/16 F

*Primary Examiner*—Carl F. Dees
*Attorney, Agent, or Firm*—Swabey, Mitchell, Houle, Marcoux & Sher

[57] ABSTRACT

The disclosure describes a process for agglomerating particulate wood material such as saw dust, wood shavings, fines, bark, tree needles, wood chips, wood dust, newspaper and cardboard material, impurities normally encountered therein and mixtures thereof. The process comprises providing a particulate wood material with a moisture content of between about 10 to 40 percent by weight calculated on a dry basis. Then, the moisture containing particulate wood material is dry mixed with dry powdered lignosulfonate to form a substantially homogeneous mixture which is compressed under a pressure of at least about 400 lbs/inch² until the particulate wood material is agglomerated. The product obtained is resilient, easily ignitable and combustible.

23 Claims, 1 Drawing Figure

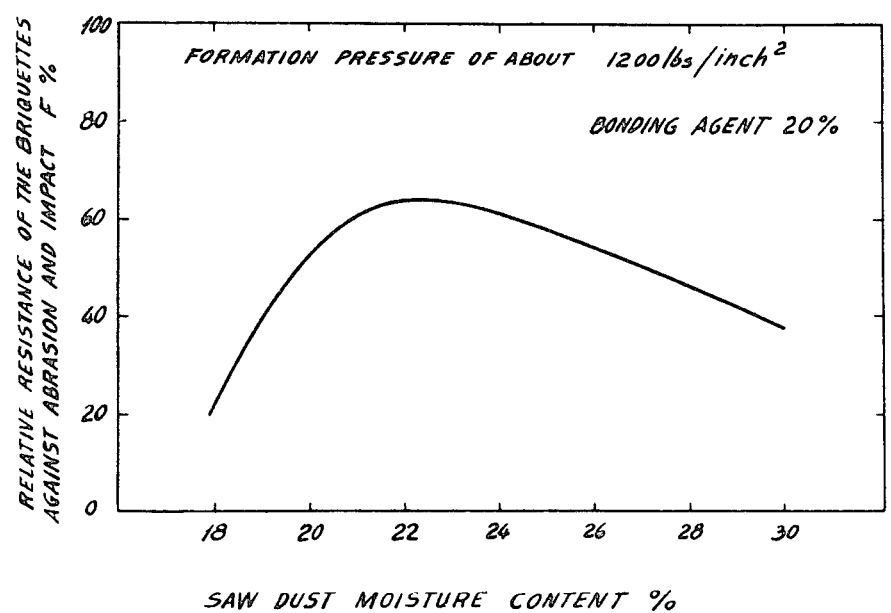

PROCESS FOR AGGLOMERATING PARTICULATE WOOD MATERIAL AND PRODUCTS OBTAINED THEREBY

This invention relates to a process for agglomerating particulate wood material and the products obtained thereby. More particularly, the present invention is directed to the manufacture of a solid combustible substance derived from saw dust and the like and intended for broiling food. The invention also relates to shaped products consisting of a homogeneous mixture of particulate wood material and dry powdered lignosulfonate.

We are becoming more and more aware of considerable damages caused to the environment by all types of pollution. Among others, there is a substantial decrease of the quality of water, resulting from an important part from the pouring of solid wastes.

Among those which are found in the rivers, saw dust is considered important. It would seem that even today, the various uses of saw dust, such as in the manufacture of panels, paper, plastic materials and general combustion materials, are not sufficient to absorb all the production, particularly that which originates in the small enterprises.

In order to decrease the polluting effect of saw dust in the rivers, the possibility of using it as a combustible for broiling food has been considered. On the other hand, there is an excellent market for this type of product because of the popularity of outdoor living.

Canadian Pat. No. 897,965 describes briquettes containing 80 parts anthracite and 20 parts saw dust, including 10% by weight of potassium nitrate as oxidizing agent. These briquettes can be easily ignited with a match and can supply the heat required for a barbeque during about 4 hours. However, these briquettes are not much different than the usual charcoal briquettes and do not use sufficient saw dust to make them attractive to use large quantities of saw dust.

In order to provide a combustible for general use, Basore (Alabama Poly Tech. Inst. Eng. Expt. Sta., Bull. No. 1, 28 (1931) has described a process for agglomerating saw dust without bonding agent in order to make briquettes. The process described by Basore consists in making briquettes at temperatures of 100° C. and under a pressure of 6500 lbs/inch$^2$ using saw dust having been preheated at 275° C. and containing 4% humidity.

Others have suggested making briquettes using saw dust and as a bonding agent, the "Tamarind Kernel Powder".

All these processes are either too complicated or do not use sufficient saw dust to make them attractive.

The process of manufacturing saw dust briquettes without bonding agent requires an important quantity of thermic energy as well as high pressure as mentioned above.

Finally, it is important that the bonding agent does not have an adverse effect on the flavor of the broiled food, or on the quality of the surrounding atmosphere.

The invention relates to a process for agglomerating particulate wood material which comprises providing the particulate wood material with a moisture content between 10 to 40% by weight calculated on a dry basis, dry mixing the particulate wood material with dry powdered lignosulfonate and forming a substantially homogeneous mixture of the lignosulfonate with the wood material, compressing the mixture under a pressure of at least about 400 lbs/inch$^2$ until the particulate wood material is agglomerated.

Naturally, compressing can be carried out in any manner known in the art, such as by moulding using a hydraulic press.

The mixture can be moulded to form logs, boards, aggregates or any other shapes whether regular or irregular, which are suitable for the intended use.

The particulate wood material which is most suitable for aggloremation using the process according to the invention is preferably saw dust. However, other materials such as wood shavings, fines, bark, tree needles, wood chips, wood dust, newspaper and cardboard material, leaves, impurities normally encountered therein and mixtures thereof may also be used.

It has been found that the use of bark as the particulate wood material alone or in combination with saw dust, at levels of 20, 50, 75 and even 100 percent of bark imparted to the combustion product a desirable appearance and combustion odor. As a matter of fact, bark has a higher caloric value than saw dust. Such a use for bark could alleviate water pollution problems, because, as it is well known, bark is often discharged into rivers.

As pointed out above, the moisture content of the particulate wood material, can vary to a certain extent between about 10 and 40% by weight calculated on a dry basis. According to Perry (Chemical Engineers Handbook, 4th Edition, McGraw-Hill Book Company, 1963), the moisture content of a material is preferably given on a dry basis, which means that the percent by weight of water is given with respect to the weight of dry solid material.

Preferred values for the moisture content are in the vicinity of about 10 to 35% and most preferrably about 18 to 25% by weight on a dry basis. The optimum value is generally set at about 22% humidity.

If the moisture content of a saw dust does not correspond to the desired moisture content it may be necessary to make some adjustments.

If the moisture content is not sufficient, it is required to add an appropriate amount of water to the saw dust. In order to enable the water to penetrate inside the wood fibers, the moisturized saw dust is allowed to rest during about 12 hours.

If the saw dust contains too much water, it would be sufficient to dry the saw dust in free air until it has reached the desired moisture content.

The amount of lignosulfonate can vary to a large extent having in mind that it is more suitable to use as much saw dust as possible in view of economical consideration.

However, it has been found out that satisfactory shaped product, such as briquettes intended for broiling foods have been produced using about 5 to 40% by weight of a lignosulfate. Preferably, this range will vary between about 8 to 30% by weight and most preferably about 15 to about 22% by weight. For practical purposes, the amount of lignosulfonate in the mixture is usually set at about 20%.

Although any so called lignosulfonate can be used, the preferred substances normally include calcium lignosulfonate, desugarized calcium lignosulfonate, sodium and calcium lignosulfonate and mixtures of these substances. The preferred substance for practical purposes is calcium lignosulfonate.

Although the dry mixing of particulate wood material such as saw dust with the lignosulfonate can be carried out at any temperature which might be found suitable for obtaining a uniform mixture of the two ingredients, it has been found that heating has no special advantage and that for all practical matter, the dry mixing might as well be carried out at room temperature.

Compressing of the mixture in order to obtain shaped products, such as briquettes, may be carried out by forming the briquettes in a mold and compressing the mixture at room temperature by means of a hydraulic press. Of course, any other suitable means can be used. The pressure can vary to a large extent and compressing is normally carried out under a pressure between about 400 and 3000 lbs/inch² until the particulate wood material is agglomerated. It has been found that best results have been obtained by using pressures above 1000 lbs/inch². For example, for elongated fibers, the pressure may vary between about 1000 to 1300 lbs/inch² while with short fibers, compressing is usually carried out at about 2000 lbs/inch².

The products obtained by the process described above consist of shaped products made of homogeneous mixture of particulate wood material having a moisture content between about 10 and 40% by weight calculated on a dry basis and dry powdered lignosulfonate, the shaped product being resilient, easily ignitable and combustible.

The invention will now be illustrated by means of the following examples, it being understood that they are given only for the purpose of illustration.

The tests were made using a saw dust having approximately the following composition: 100% spruce and 5% fir. In the case test numbers 1 to 20, the saw dust was made of long fibers, while for tests 21 to 33 short fibers were used.

Briquetting lasts at most ½ minute and is carried out at room temperature.

TABLE I

| Test No. | L % | H % | P lb/inch² | Surface | Elongation | Firmness |
|---|---|---|---|---|---|---|
| Bonding agent: Calcium lignosulfonate | | | | | | |
| 1 | 40 | 35 | 1430 | A | A | A |
| 2 | 30 | 35 | 1180 | A | A | A |
| 3 | 20 | 35 | 1020 | B | A | A |
| 4 | 20 | 0 | 2440 | C | C | C |
| 5 | 15 | 35 | 1220 | B | B | B |
| 6 | 15 | 35 | 1220 | B | B | B |
| 7 | 10 | 26 | 1280 | B | B | B |
| 8 | 10 | 22 | 1100 | B | B | B |
| 9 | 5 | 26 | 1280 | B | C | B |
| Bonding agent: desugarized calcium lignosulfonate | | | | | | |
| 10 | 40 | 32 | 2040 | A | A | A |
| 11 | 20 | 32 | 1610 | A | A | A |
| 12 | 20 | 0 | 2040 | C | C | C |
| 13 | 15 | 32 | 1710 | A | A | A |
| 14 | 10 | 30 | 1240 | B | C | B |
| 15 | 10 | 26 | 1870 | A | A | B |
| 16 | 10 | 25 | 1320 | B | B | B |
| 17 | 10 | 22 | 1270 | B | B | B |
| 18 | 5 | 26 | 1510 | B | C | C |
| Bonding agent: calcium and sodium lignosulfonate | | | | | | |
| 19 | 20 | 22 | 1150 | B | B | A |
| 20 | 15 | 22 | 1280 | B | B | B |
| 21 | 20 | 30 | 1260 | C | C | C |
| 22 | 20 | 25 | 1160 | C | C | B |
| 23 | 20 | 22 | 1360 | B | B | B |
| 24 | 20 | 19 | 1320 | A | B | B |
| 25 | 15 | 30 | 1240 | C | C | C |
| 26 | 15 | 25 | 1280 | C | C | C |
| 27 | 15 | 22 | 1450 | B | B | C |
| 28 | 15 | 19 | 1260 | A | B | B |
| 29 | 10 | 25 | 1390 | C | C | C |
| 30 | 10 | 22 | 1270 | B | C | C |
| 31 | 10 | 19 | 1390 | B | C | C |
| 32 | 5 | 22 | 1260 | B | C | C |
| 33 | 5 | 19 | 1380 | B | C | C |

L: Bonding agent
H: Moisture content
P: Pressure
A: Excellent
B: Average
C: Bad

The results of these tests would tend to indicate that an increase of the proportion of bonding agent requires an increase of the water content of the saw dust, in order to solubilize all the bonding agents. It is therefore possible to make briquettes of high quality by increasing the proportion of bonding agents, without however, giving any outstanding and unexpected results.

It would therefore appear that the water content is important in many cases, especially when the percentage of bonding agent is low; the water content should be within a restricted range in order to obtain satisfactory results. It would therefore be expected that for a given percentage of bonding agent, there should be an optimum value of water content. It should also be noted that it has been impossible to produce briquettes of suitable firmness when the saw dust has no water content. Although the amount of water which is present in the saw dust is critical for producing briquettes, it would be expected that this water content has no influence on the combustion of the briquettes because water evaporates during the stabilization or drying of the briquettes at room temperature.

The effect of the pressure variation is not so important as can be seen from the above results.

Broiling tests were made using charcoal briquettes and charcoal produced by the process according to the invention and the results are given in the following Table II.

Table II—Broiling Tests

Steaks of ¾ inch thickness broiled over briquettes prepared with 20% of calcium lignosulfonate. The broiled steaks were judged on an organoleptic scale of 1 to 7 (very poor to very good) by 30 judges.

| | Average Flavor Score | Average Texture Score |
|---|---|---|
| Loin steaks | | |
| Pressed charcol | 5.27 | 4.93 |
| 10 Sawdust briquettes | 5.13 | 4.93 |
| Top round steaks | | |
| 10 10 Pressed charcol | 4.94 | 4.38 |
| 10 10 Sawdust briquettes | 5.06 | 4.44 |

There was no statistical difference between the values obtained from the two types of combustion material.

It would therefore appear that the briquettes or similar shaped products made with particulate wood material, such as saw dust, and lignosulfonate make an excellent substitute for the well known charcoal briquettes, especially having in mind that they are made with two basic substances which contribute to the pollution of our rivers.

The invention will be illustrated further by means of the following drawing in which:

FIG. 1 is a curve showing the relative resistance of the briquettes against abrasion and impact versus the moisture content of sawdust.

The relative resistance was measured by tumbling the briquettes in a perforated rotating cylinder with baffles. The stability factor "F" of the briquettes is the percentage ratio of the fragments remaining in the cylinder after tumbling.

FIG. 1 establishes that the maximum resistance of the briquettes against abrasion and impact is obtained at about 22% moisture of the saw dust.

Other moisture contents give products which are less satisfactory although sometime quite acceptable.

We claim:

1. Process for agglomerating particulate wood material which comprises:
   (a) providing essentially particulate noncarbonized wood material having a substantially homogeneously distributed moisture content throughout and substantially heterogeneous size and shape distribution, said moisture content varying between about 10 and about 40 percent by weight calculated on a dry basis;
   (b) dry mixing said particulate wood material with dry powdered lignosulfonate and forming a substantially homogeneous free-flowing mixture essentially consisting of said dry powdered lignosulfonate and said particulate wood material;
   (c) compressing said mixture under a pressure of as low as about 400 lbs/inch² until said particulate wood material is agglomerated.

2. Process according to claim 1, wherein said compressing is carried out by moulding.

3. Process according to claim 1, wherein said compressing is carried out by molding said mixture into briquettes.

4. Process according to claim 1, wherein said compressing is carried out by molding said mixture into logs.

5. Process according to claim 1, wherein said compressing is carried out by molding said mixture into boards.

6. Process according to claim 1, wherein said compressing is carried out by molding said mixture into aggregates.

7. Process according to claim 1, wherein said particulate wood material comprises saw dust, wood shavings, fines, bark, tree needles, wood chips, wood dust, newspaper and cardboard material, leaves, impurities normally encountered therein and mixtures thereof.

8. Process according to claim 1, wherein said moisture content is between about 10 to 35 percent by weight.

9. Process according to claim 8, wherein said moisture content is between about 18 to 25 percent by weight.

10. Process according to claim 1, wherein said moisture content is about 22 percent by weight.

11. Process according to claim 1, wherein said particulate wood material is mixed with about 5 to about 40 percent by weight of lignosulfonate.

12. Process according to claim 1, wherein said particulate wood material is mixed with about 8 to about 30 percent by weight of lignosulfonate.

13. Process according to claim 1, wherein said particulate wood material is mixed with about 15 to about 22 percent by weight of lignosulfonate.

14. Process according to claim 1, wherein said particulate wood material is mixed with about 20 percent by weight of lignosulfonate.

15. Process according to claim 1, wherein said lignosulfonate is selected from the group consisting of calcium lignosulfonate, desugarized calcium lignosulfonate, sodium and calcium lignosulfonate and mixtures thereof.

16. Process according to claim 1, wherein said lignosulfonate is calcium lignosulfonate.

17. Process according to claim 1, wherein dry mixing is carried out at room temperature.

18. Process according to claim 1, wherein compressing is carried out at 800 to 1300 lbs/inch² for elongated fibres.

19. Process according to claim 14, wherein compressing is carried out at about 2000 lbs/inch² for short fibres.

20. Process according to claim 1, wherein said particulate material includes bark.

21. Process according to claim 20, wherein said bark is used in amounts up to about 100 percent by weight of the wood material.

22. Process according to claim 3, wherein briquetting lasts ½ minute.

23. Shaped product consisting of a substantially homogeneous mixture of essentially particulate non-carbonized wood material having a moisture content between about 10 and about 40 percent by weight calculated on a dry basis and a substantially heterogeneous size and shape distribution, and dry powdered lignofulsonate, said shaped product being resilient, easily ignitable and combustible.

* * * * *